No. 721,785. PATENTED MAR. 3, 1903.
C. M. DAY & J. ANDERSON.
APPARATUS FOR MAKING PULLEY MOLDS.
APPLICATION FILED OCT. 21, 1901.
NO MODEL. 2 SHEETS—SHEET 1.

No. 721,785. PATENTED MAR. 3, 1903.
C. M. DAY & J. ANDERSON.
APPARATUS FOR MAKING PULLEY MOLDS.
APPLICATION FILED OCT. 21, 1901.
NO MODEL. 2 SHEETS—SHEET 2.
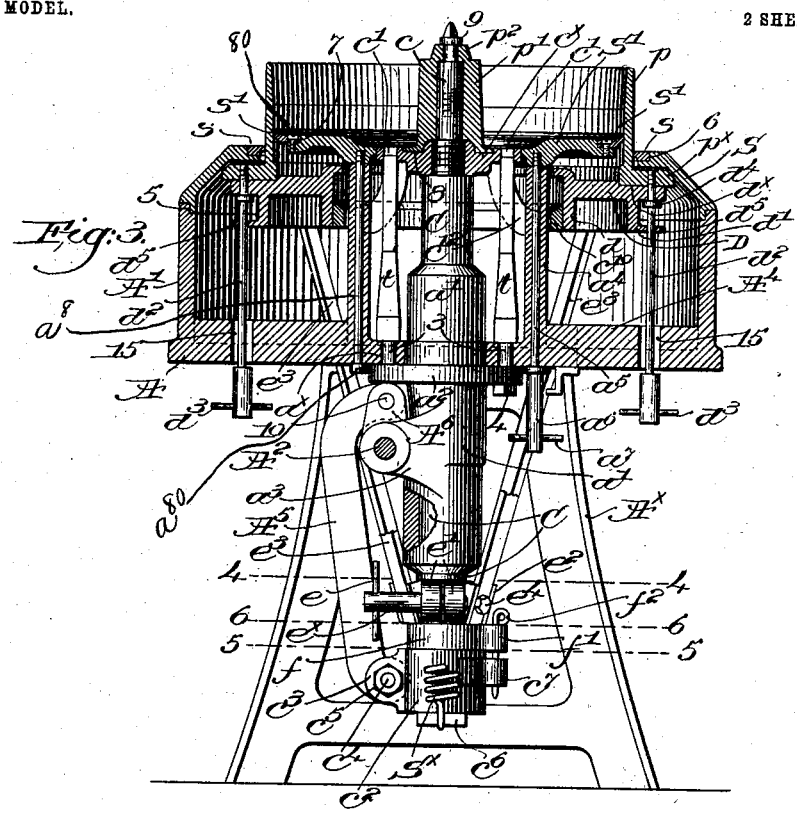
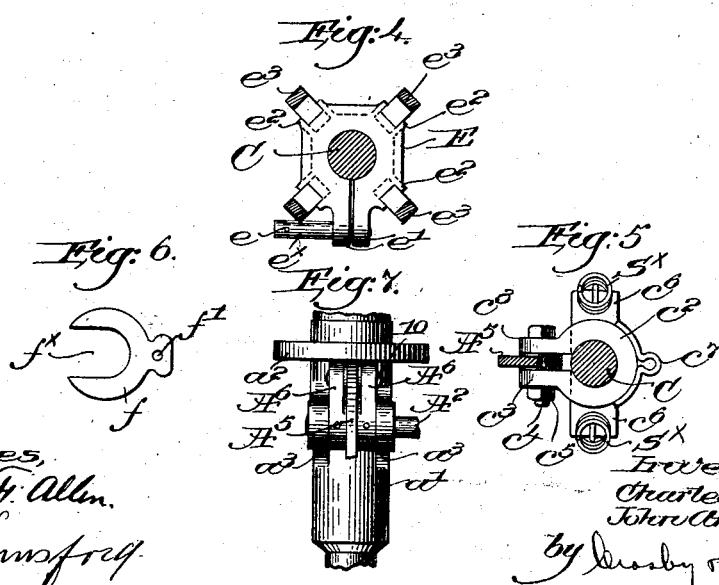

UNITED STATES PATENT OFFICE.

CHARLES M. DAY AND JOHN ANDERSON, OF HOPEDALE, MASSACHUSETTS, ASSIGNORS TO DRAPER COMPANY, OF HOPEDALE, MASSACHUSETTS, A CORPORATION OF MAINE.

APPARATUS FOR MAKING PULLEY-MOLDS.

SPECIFICATION forming part of Letters Patent No. 721,785, dated March 3, 1903.

Application filed October 21, 1901. Serial No. 79,328. (No model.)

*To all whom it may concern:*

Be it known that we, CHARLES M. DAY and JOHN ANDERSON, citizens of the United States, residing at Hopedale, county of Worcester, and State of Massachusetts, have invented an Improvement in Apparatus for Making Pulley-Molds, of which the following description, in connection with the accompanying drawings, is a specification, like characters on the drawings representing like parts.

This invention relates to apparatus for making molds for metal-founding, and more particularly to apparatus for making pulley-molds; and it has for its object the production of novel apparatus for greatly facilitating the formation of such molds without the aid of highly-skilled labor, means being provided whereby a wide range of work may be executed with one and the same apparatus in so far as relates to the width of pulley-face, the diameter of the pulley, and other structural details thereof.

The various novel and important features of our invention will be hereinafter described, and particularly pointed out in the following claims.

In constructing the mold for a pulley in accordance with our invention the cope may be made on what is technically termed a "flat back"— viz., a flat plate with such portions of a pattern rigidly secured to it as can be readily drawn from the mold—or it may be constructed with an apparatus similar to the one forming the subject-matter of our present invention, so that while the formation of the drag is more particularly referred to hereinafter it is to be understood that our invention is not in any manner restricted thereto.

Figure 1:
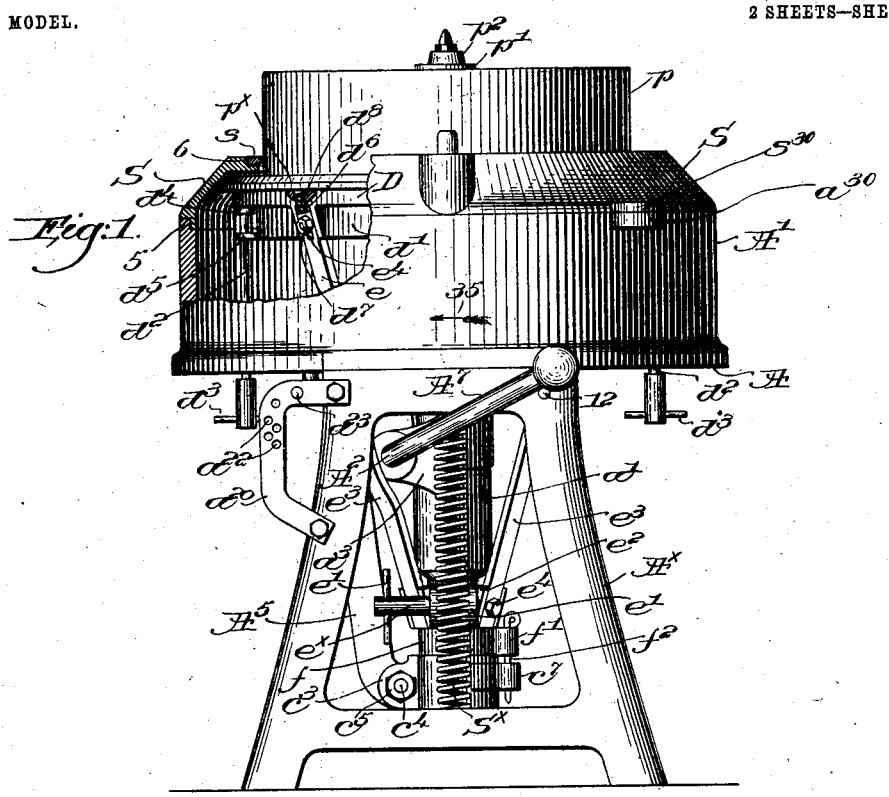
Figure 2:
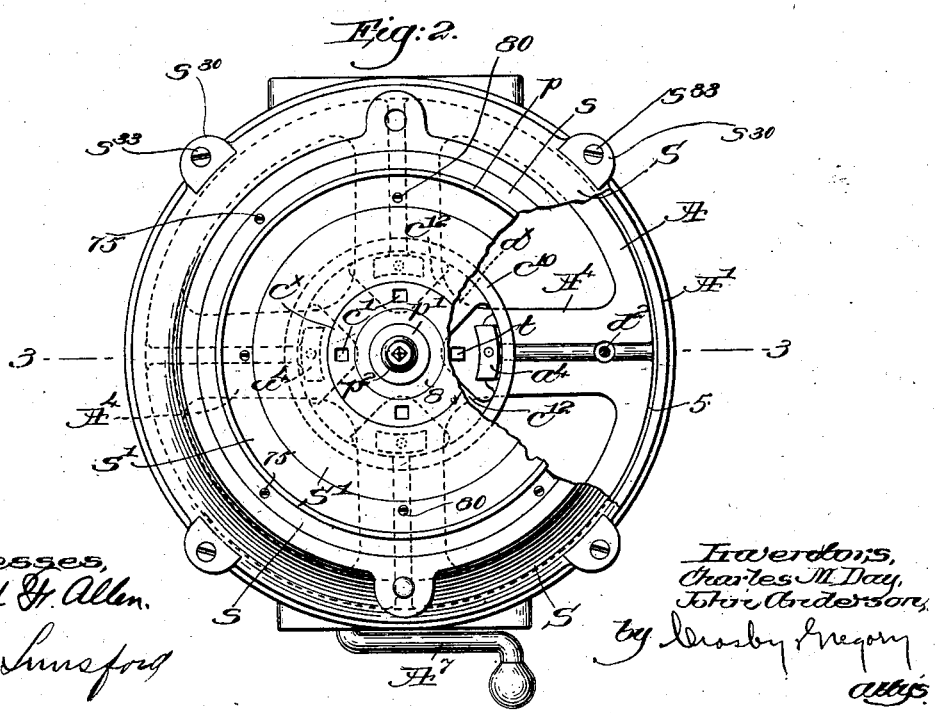

Figure 1 is a side elevation, partly broken out, of a pulley-molding apparatus embodying one form of our invention, the apparatus being shown in operative condition, ready for the application of the flask and the construction of the mold. Fig. 2 is a top or plan view thereof, partly broken out to show parts located below the pattern and stripping means. Fig. 3 is in the main a vertical sectional view of the apparatus on the line 3 3, Fig. 2, the greater portion of the pattern-drawing mechanism being shown in elevation. Fig. 4 is a horizontal sectional detail on the line 4 4, Fig. 3, looking down, of a part of the means for effecting a variation in the width of the pulley-face. Fig. 5 is a similar view on the line 5 5, Fig. 3, looking down, of a detail of the pattern-drawing mechanism to be described. Fig. 6 is a top or plan view, detached, of the face-regulating member, which by its thickness determines the width of the pulley-face to be molded, said member being shown in side elevation in operative position between the broken lines 5 5 and 6 6, Fig. 3; and Fig. 7 is a detail showing in front elevation the ears for supporting the operating-shaft viewing Figs. 1 and 3 from the left-hand side thereof.

We have herein shown the operative parts of the apparatus as mounted on a heavy circular head A, having an upturned annular flange A', the head being supported at a suitable height by suitable upright standards $A^\times$, rigidly secured thereto, the standards forming a firm base for the apparatus. The head is connected by radial arms $A^4$ with a central hub $a^\times$, (See Figs. 2 and 3,) through which hub is passed an upright long tubular bearing $a'$, having an annular flange $a^2$, which rests against the bottom of the hub and is secured thereto by bolts 3, having retaining-nuts 4 screwed thereupon, the upper end of the bearing projecting above the head, as shown in Fig. 3, and its lower end depending below the head between the standards. Lateral ears $a^3$ on the bearing below the flange $a^2$ form bearings for a horizontal operating-shaft $A^2$, to be hereinafter referred to. The top of the head-flange A' is shouldered, as at 5, to form a seat for the outer member S of the stripper-plate, said member being herein shown as substantially frusto-conical and having an annular internal seat 6 in its top (see Fig. 3) for the reception of a removable stripper-ring or filler $s$, which supports the sand of the mold immediately adjacent the external face of the rim portion of the pattern to be described.

By using stripper-rings or fillers of different internal diameter it will be manifest that patterns having corresponding external rim diameters may be used without changing the member S, and if still greater variation in diameter is required other stripper members may be used having larger or smaller diameters at their upper ends, so that in this respect the apparatus has a very wide range as to the different sizes of pulley-molds which can be made therewith.

It is to be understood that the apparatus embodying our invention belongs to the class of molding apparatus wherein the parting face of the mold is obtained by the use of a stripper-plate, the pattern being movable relatively to the stripper-plate and being provided with means to move it when it is desired to draw the pattern from the mold.

In an apparatus of this class for making pulley-molds the pattern in accordance with our present invention comprises, essentially, an annular rim portion $p$ and a hub $p'$, the rim portion being concentric with the hub, and these parts constituting the pattern are so supported that they can be readily drawn after the mold has been completed, and we have also provided means whereby with one rim portion of the pattern we are enabled to make molds for pulleys having faces of different widths, and inasmuch as the rim portion of the pattern is circular a circular opening therefor must be provided in the stripping means, and we have accordingly made such stripping means as two concentric circular members or plates, the outer member S having been already referred to. The inner and coöperating member of the stripper is herein shown, having more particular reference to Fig. 3, as a circular plate S', having its outer circumference recessed to form an annular seat 7 to receive a stripper-ring or filler $s'$, which will support the sand of the mold adjacent the inner face of the rim portion of the pulley, the said inner stripper-ring being also detachably secured in the seat 7 in order that by using rings of different external diameter pulleys of corresponding diameters may be molded. The inner stripper member S' and its ring $s'$ are shaped to conform to the desired configuration of the web which is to connect the rim and hub of the completed pulley, and it will be seen by reference to Fig. 3 that the inner stripper member is elevated somewhat above the plane of the outer stripper-ring $s$ in order to obtain the proper width for the inner and outer faces of the rim. Upright standards $a^4$ are erected upon the arms $A^4$ of the head, such standards being shown in Fig. 2, and these standards, which are arranged equidistant from the center of the head, support the inner stripper member S', said member being securely but detachably held in place on the standards by means of long threaded rods $a^5$, which are passed up through holes in the standards and screw into the stripper member, as shown in Fig. 3, and preferably three of these rods are extended downward below the head, as at $a^6$, and are provided with handles $a^7$, by which they may be rotated to screw them into or out of the stripper member. The fourth fastening-rod (shown at the left in Fig. 3 and indicated by the reference-letter $a^8$) has a simple nicked head $a^{80}$ at its lower end to receive a screwdriver or similar tool, this construction being adopted in order that certain portions of the actuating mechanism may have a clear and unobstructed movement. The inner stripper member S' has a central opening which is filled by a center plate $c^x$, (best shown in Fig. 3,) which is screwed onto the threaded and reduced upper end of a plunger C, which is vertically movable in and supported by the elongated bearing $a'$, the plunger having a non-threaded part $c$ at its extreme upper end adapted to receive the hub-pattern $p'$, the base of said hub-pattern resting in an annular recess 8 in the center plate $c^x$ and being retained in place on the plunger by a suitable nut 9. The hub-pattern is made with a core-print $p^2$, which will support the end of the hub-core when the two parts of the mold are assembled in readiness for casting.

We have herein shown the center plate as provided with holes $c'$, and these holes are partly filled by stools $t$, which rest on the central hub $a^x$ of the head, and for convenience we have shown the bolts 3 as secured to or forming a part of the lower ends of the stools. The sockets formed in the center plate $c^x$ by the holes $c'$ will be filled with sand in the molding operation, and these little columns of sand are supported by the stools, so that when the pattern is drawn and the center plate is lowered, as will be hereinafter described, the stools will support these little cores, the object of such cores being to produce holes in the pulley-web, through which bolts may be passed to secure a gear or other device to the completed pulley. It will be manifest that if no such openings are desired in the completed pulley the stools may be omitted and a solid center plate used, and in that case any suitable short bolts would connect the bearing $a'$ with the head of the apparatus.

The plunger C extends below the lower end of the bearing and has secured to it at its lower extremity a split collar $c^2$, (see Fig. 5,) provided with laterally-extended ears $c^3$, through which a pivot-bolt $c^4$ is extended, a nut $c^5$ on the bolt tightening up the collar and clamping it securely on the plunger. The lower end of a link $A^5$ is inserted loosely between the ears and fulcrumed upon the pivot-bolt $c^4$, the upper end of the link being bent over and inward, as clearly shown in Fig. 3, and pivotally connected by a pin 10 with crank-arms $A^6$, rigidly secured to the operating-shaft $A^2$, (see Figs. 3 and 7,) the said operating-shaft being extended at one end beyond one of the standards $A^x$ and being bent, as at $A^7$, to constitute a handle by means of which the shaft may be rocked in one direction or the other to raise or lower the plunger C. In the drawings the handle is shown as resting against a stop-pin 12 on one of the standards $A^\times$ (see Fig. 1) and the plunger is in its elevated position, the parts then being in condition for the construction of the mold. A cross-bar $c^6$ is attached to the clamp-collar $c^2$ in any suitable manner and projects laterally beyond the same, and the lower ends of two strong spiral springs $S^\times$ are attached to the cross-piece, the upper ends of the springs being secured in any suitable manner to the standards $A^\times$, the springs tending to lift the plunger C and the parts carried thereby and serving to counterbalance to a certain extent the weight of the parts, and thereby render the operation of the apparatus easier. The collar $c^2$ is provided with an eye $c^7$ for a purpose to be described, the eye being located substantially diametrically opposite the ears $c^3$ for convenience.

Referring now more particularly to Figs. 2 and 3, an annular guide $c^{10}$ is shown as outside the series of upright standards $a^4$, and it is rigidly secured to or connected with the center plate $c^\times$ by the downwardly and outwardly curved arms $c^{12}$, this guide coöperating with an inner depending flange $d$ of an annular table D, which forms a part or member of the pattern-carrier taken as a whole, the said table having an annular recess $d^\times$ in its top and adjacent its outer circumference to receive the laterally-extended foot or flange $p^\times$ of the rim portion $p$ of the pattern. The table D is provided with a second depending flange $d'$ (clearly shown in cross-section in Fig. 3) and provided with a series of lateral ears $d^5$, Figs. 1 and 3. Extended through these ears and the projecting part of the table above them we have shown attaching-rods $d^2$, screw-threaded at their upper ends (see Fig. 3) to enter correspondingly-threaded holes in the foot $p^\times$ of the rim portion of the pattern to secure the same firmly to the table, the rods passing freely through holes 15 in the arms of the head A and being provided below the same with suitable handles $d^3$, by which to manipulate them. Collars $d^4$, fast on the rods between the ears $d^5$ and the overhanging part of the table, serve to prevent the rods from dropping out when they are unscrewed from the pattern. These attaching screws or rods are made in this way in order that the part of the pattern supported by the table D can be readily attached to or removed therefrom and without necessitating access to the interior of the apparatus—that is to say, within the flange A', surmounting the head. Manifestly any other suitable mode of attachment could be used between the table and the part of the pattern supported thereby; but it would not be so convenient or so readily accessible as the means we have herein shown. The guide-ring $c^{10}$ by its engagement with the flange $d$ of the table laterally supports the latter relatively to the plunger C, inasmuch as the center plate $c^\times$ is attached thereto, and other means, to be described, are provided for positively connecting the table with the plunger in order that the table shall rise and fall therewith. The sliding fit between the guide-ring $c^{10}$ and the flange $d$ provides for vertical adjustment of the table relatively to the plunger when changing from a pulley-mold having a face of one width to another width.

Referring to Fig. 3, wherein the parts are in operative position, it will be manifest that the width of the face of the pulley-rim is determined by the depth of the exposed portion of the rim-pattern $p$ above the outer stripper member S, and this depth is absolutely dependent upon the vertical position of the table D.

Supposing that the maximum width attainable with the pattern $p$ is illustrated in Fig. 3, then obviously if the table is lowered so as to expose a less depth of the pattern above the stripper member S a correspondingly-narrower pulley-face will be molded, and the means for varying the operative position of the table relative to the stripping means and for connecting the table with the plunger will now be described.

A split clamp E (shown in plan Fig. 4) surrounds the plunger below the bearing $a'$ and is adapted to be clamped upon it by means of a clamping-screw $e^\times$, having a suitable handle $e$ and mounted in suitably-threaded ears $e'$ of the plate, the latter having a series of upturned divergent seats $e^2$, four being shown herein, to receive the lower ends of rigid connecting-links $e^3$, held in the seats by bolts $e^4$, the upper ends of the links separating, as shown in Figs. 1 and 3, to enter seats $d^6$, formed on the exterior of the flange $d'$ of the table D. Fastening-bolts $d^7$ pass through longitudinal slots $e^4$ in the upper ends of the links and into the flange $d'$ to secure the links to the table, the latter being thus positively connected with the plunger.

In order to level the table so that its movement shall be absolutely at right angles to the plane of the face of the stripper member S, we have provided leveling-screws $d^8$, which pass through the part of the table overhanging the flange $d'$ and bear upon the upper ends of the links, as shown clearly in Fig. 1, so that by loosening the bolts $d^7$ and rotating the leveling-screws $d^8$ in one direction or the other, as required, the table may be accurately and readily leveled, after which the bolts $d^7$ are set up tight. The links $e^3$ thus form a rigid connection between the table and the plunger C, so that the two will move in unison, and thereby when the plunger is lowered the table will be lowered and the attached rim-pattern $p$ will be drawn from the mold, the hub-pattern $p'$ being at the same time drawn by the descent of the plunger. The links pass up between the radial arms $A^4$, connecting the circular head with its center hub, and from the foregoing description it will be clear that by changing the vertical position of the clamp-plate E on the plunger the vertical position of the table will be changed correspondingly to thereby vary the width of the pulley-face when molded.

Inasmuch as pulley-faces vary in width by fixed amounts, it is highly desirable to provide simple means for quickly adjusting the clamp-plate E on the plunger according to the width of face desired, and for this purpose we have provided a series of face-regulating members alike in plan view, but of different thickness, and one member of such a series is shown in plan in Fig. 6 and consisting of a disk-like body $f$, having a reëntrant portion $f^\times$ to snugly embrace the plunger C, and the body is provided with an eye portion $f'$. One of these face-regulating members is introduced between the clamp-ring $c^2$ and the clamp-plate E, as shown in Figs. 1 and 2, and by the thickness of such member the width of the pulley-face is determined. In order to change from one width to another, the operator swings the handle $A^7$ over in the direction of the arrow 35, Fig. 1, until the table D rests upon the tops of the arms $A^4$, he having previously loosened the clamp-plate E, and the operator continues to move the handle $A^7$ after the table has been seated, as described, until the plunger has descended far enough further to permit the ready withdrawal or insertion of a face-regulating member. The member then in place is withdrawn by removing a locking-pin $f^2$, which is dropped through the ears $f'$ and $c^7$, and another face-regulating member is inserted, having a thickness corresponding to the desired width of the pulley-face. The operator then swings the handle $A^7$ opposite to the arrow 35 until the top of the member $f$ contacts with the bottom of the clamp-plate E, and the latter is securely clamped in place on the plunger. Then by throwing the handle $A^7$ over against the stop-pin 12, Fig. 1, the apparatus is ready for use.

In Figs. 1 and 3 the apparatus is adjusted to produce the widest pulley-face possible with the rim-pattern $p$, and obviously narrower faces will be produced by substituting thinner face-regulating members $f$ in place of the one shown. For convenience these members may be numbered or otherwise marked so that the molder having been instructed to prepare molds for a certain width of face will be able to follow out his instructions merely by selecting the proper regulating member and putting it in place in the apparatus, as has been described.

The construction of the apparatus is such that the drawing movement to draw the pattern is centrally applied and the arrangement of the link connecting the operating-shaft and the plunger is such that a very direct and substantially vertical pull or thrust is attained and applied substantially at the center of the pattern-carrier.

The pattern-carrier, broadly speaking, is that part of the apparatus which carries the movable part or parts of the pattern, and in the apparatus herein shown the pattern-carrier comprises the table D and the plunger C.

A bracket $a^{20}$ is secured to the standard $A^\times$ nearest the operating-handle $A^7$, said bracket having a number of holes $a^{22}$ therein, any one of which is adapted to receive a stop-pin $a^{23}$, Fig. 1, to limit the throw of the handle when turned to draw the pattern. The pin will be inserted in one of the holes corresponding to the requisite length of the "draw." The longer the draw the lower will the stop-pin be located, so that all the molder has to do is to swing the handle over against the stop-pin $a^{23}$ to fully draw the pattern, and by swinging it back against the stop 12 the parts will be restored to operative position. Of course when adjusting the table D, as described, the stop-pin $a^{23}$ will be withdrawn to permit the greater throw of the handle.

Rim-patterns of different diameters can be mounted on the table of the pattern-carrier, and a large number of pulleys of different diameter can thus be molded on one apparatus, the range of work which can be produced by means of our invention being very extended by means of the various adjustments or changes which have been described and which changes and adjustments can be readily and quickly effected.

We have shown and described one practical embodiment of our invention without attempting to illustrate various modifications thereof which may be made by those skilled in the art, and accordingly changes and modifications in general details and arrangement of parts may be made without departing from the spirit and scope of our invention.

Referring to Figs. 1 and 2, the upright flange $A'$ is shown as provided with lateral and radially-projecting ears $a^{30}$ to register with similar ears $s^{30}$ on the outer stripper member S when the latter is in position, and fastening-screws $s^{33}$, (see Fig. 2,) screwed into threaded openings in the superposed ears, serve to rigidly connect the stripper member S with the supporting-flange $A'$. In Fig. 2 the outer stripper-ring or filler $s$ is shown as detachably secured in its seat by suitable screws 75, and the inner stripper-ring or filler $s'$ is secured in its seat on the inner stripper member $S'$ by suitable screws 80.

Having described our invention, what we claim as new, and desire to secure by Letters Patent, is—

1. In apparatus of the class described, a supporting-head having a central upright bearing extending above and below it, a pattern-carrier, including a plunger longitudinally movable in and supported by said bearing, and extended below it, concentric and annular stripper members rigidly and detachably mounted on the head, a pattern mounted on the pattern-carrier, and means located wholly below the head and connected with the lower end of the plunger, to move the pattern-carrier at right angles to the stripper members, to operatively position and to draw the pattern.

2. In apparatus of the class described, a head having a circular, upturned flange, and upright standards within the flange, concentric annular stripper members detachably secured to and supported by the flange and standards respectively, means accessible exterior to the head to secure the inner stripper member to the standards at their upper ends, a pattern, and means to move it into and out of operative position relatively to the stripper members.

3. In apparatus of the class described, fixed and concentric annular stripper members, a coöperating pattern, including hub and rim portions, a movable pattern-carrier, and external means to adjust the rim portion of the pattern thereon for different widths of face.

4. In apparatus of the class described, fixed and concentric annular stripper members, a coöperating pattern, including hub and rim portions, a movable pattern-carrier, means to move it toward and from the stripper members, a stop to limit its movement toward said members, and means to adjust the rim portion of the pattern on the carrier, to vary the depth of the exposed portion when in operative position, said means including a detachable face-regulating member.

5. In apparatus of the class described, stripping means, a coöperating pattern, including a rim portion, a pattern-carrier, including a central vertically-movable plunger, a concentric table on which the rim portion of the pattern is detachably mounted, and adjustable rigid and direct connections between the lower end of the plunger and the table, whereby the degree of exposure of the rim portion above the stripper means may be varied.

6. In apparatus of the class described, a pattern, including hub and annular rim portions, a pattern-carrier, means to move it to operative position, and to draw, the pattern, a head, fixed stripping means mounted thereon and having concentric openings for the hub and rim portions of the pattern, respectively, and means located below and wholly exterior to the head to adjust the rim portion of the pattern on the pattern-carrier relatively to the hub, to thereby vary the depth of the rim portion exposed above the stripping means when the pattern is in molding position.

7. In apparatus of the class described, fixed and concentric annular stripper members, a coöperating pattern, comprising a plurality of parts, a compound pattern-carrier upon which the parts of the pattern are separately mounted, and means to effect a relative adjustment of the members of the pattern-carrier to predetermine the relative exposure of the parts of the pattern when in molding position, and means to level the members of the pattern-carrier relatively to each other.

8. In apparatus of the class described, a head, inner and outer annular stripper members concentrically supported upon the head to present an annular clearance between the adjacent edges of the stripper members, a pattern-carrier including a plunger movable toward and from the stripper members, a concentric annular table, adjustable connections between it and the plunger, a center table-guide rigidly mounted on the plunger, and a pattern including a hub and an annular rim portion, detachably mounted on the plunger and table, respectively, and actuating means for the pattern-carrier, adjustment of the table providing for a variation in the width of the face of the rim portion of the mold.

9. In apparatus of the class described, a head, having a vertical, elongated bearing secured thereto, stripping means mounted on the head, a pattern-carrier including a plunger longitudinally movable in the bearing, a concentric annular table and an adjustable connection between the table and the plunger, a face-regulating member to coöperate with the connection between the table and the plunger to determine the relative position of the plunger and table when in operative position, and a multipart pattern mounted on the pattern-carrier.

10. In apparatus of the class described, stripping means, a coöperating pattern including an annular rim portion, a pattern-carrier, including a table having a central opening, means to enter said opening and engage the table, to centrally support and guide the same, and actuating means for the pattern-carrier, said means including an operating crank-shaft and a link connecting said crank-shaft and pattern-carrier, constructed and arranged to apply the motive power to the carrier at or near its center.

11. In apparatus of the class described, a head, having an elongated, upright bearing, a pattern-carrier including a plunger longitudinally movable in said bearing, and an annular table connected with said plunger to move in unison therewith, and means to level the table.

12. In apparatus of the class described, a pattern-carrier including a central plunger, a support for the latter, a table concentric with the plunger, rigid connections between it and the plunger, including a clamp, a removable face-regulating member to determine by its thickness the position of the table relatively to the plunger of the pattern-carrier, and means to operate the plunger.

13. In apparatus of the class described, concentrically-mounted and fixedly-supported annular stripper members presenting a central opening, and an annular opening between the adjacent edges of said members, a pattern-carrier including a central plunger and a concentric table rigidly connected therewith, a center plate mounted on the plunger and adapted to enter the central opening in the inner stripper member when the pattern is in its operative position, and a pattern comprising a hub and an annular rim portion, mounted respectively upon the center plate and the table.

14. In apparatus of the class described, a head, stripping means fixedly mounted thereon, having a central opening and a concentric annular opening, a pattern-carrier movable at right angles to said stripping means, means supported by the head to move and guide the pattern-carrier, a center plate mounted on the carrier and provided with apertures, upright stools supported by the head and coöperating with the apertured center plate to support the portions of the mold formed by the apertures when the pattern is drawn, and a pattern mounted on the pattern-carrier and including a central hub and an annular rim portion.

15. In apparatus of the class described, a rigidly-supported head having a central, vertical and elongated bearing extended below it, stripping means mounted on the head, a pattern-carrier including a plunger supported by and vertically movable in the elongated bearing and extending through and below it, a collar rigidly secured to the lower end of the plunger, counterbalancing-springs connecting the latter and the head, an operating crank-shaft mounted on the bearing below the head, a link pivotally connected with said shaft and the collar on the plunger, and a pattern mounted on the pattern-carrier above the head and coöperating with the stripping means.

In testimony whereof we have signed our names to this specification in the presence of two subscribing witnesses.

CHARLES M. DAY.
JOHN ANDERSON.

Witnesses:
GEORGE OTIS DRAPER,
ARTHUR W. BEARDSELL.